May 3, 1949. E. VILLIGER 2,468,902
DOUBLE-WALLED BODY FOR HOT GASES OR VAPORS
UNDER SUPERATMOSPHERIC PRESSURE
Filed Aug. 21, 1945
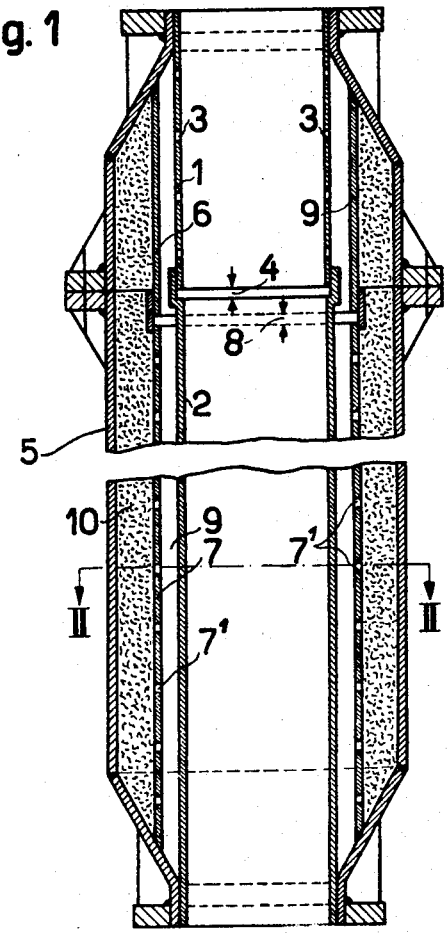
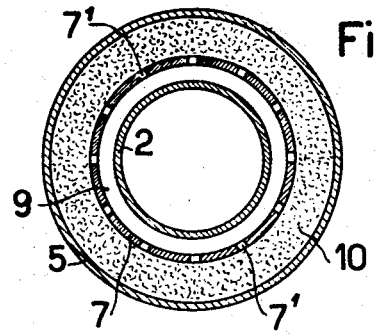
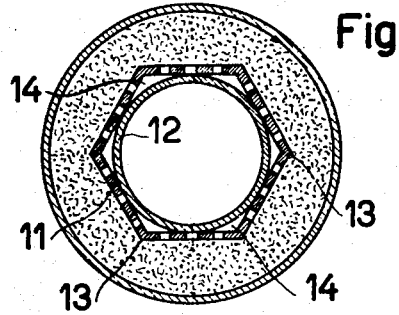
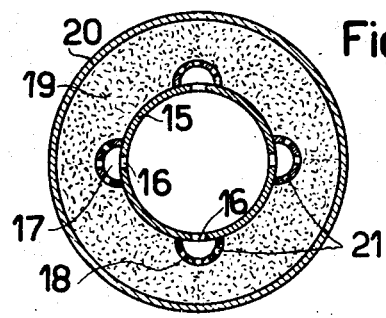
Inventor
Eugen Villiger
By Dodge and Ima
Attorneys Patented May 3, 1949

2,468,902

UNITED STATES PATENT OFFICE 2,468,902

DOUBLE-WALLED BODY FOR HOT GASES OR VAPORS UNDER SUPERATMOSPHERIC PRESSURE

Eugen Villiger, Zurich, Switzerland, assignor to Aktiengesellschaft Fuer Technische Studien, Zurich, Switzerland, a corporation of Switzerland Application August 21, 1945, Serial No. 611,876
In Switzerland October 20, 1944

4 Claims. (Cl. 138—64)

This invention relates to a double-walled body, such as a double-walled tube for conveying hot gases and vapours under pressures higher than atmospheric pressure and in which a space between the inner and outer walls is filled with heat insulating material and means for an equalisation of the pressure between the space filled with insulating material and the space within the inner body are provided.

If the double-walled body be constructed for example, as a double-walled tube, the inner tube, which assumes approximately the same temperature as the medium flowing through it, has, as is well known, to convey the current of steam or vapour, while the outer tube, the temperature of which is kept by the insulating layer at such a height that the properties of its material, particularly its strength, are not impaired thereby, has to withstand the pressure of the medium flowing through. Such a separation of the two functions, namely the conveyance of the flowing medium and the resistance to pressure, by using two constructional parts separated from each other by an insulating layer, can only be achieved, seeing that the strength of the inner tube decreases greatly as soon as it is highly heated, if provision be made for an equalisation of pressure between the annular space filled with heat insulating material between the inner and outer tubes and the interior of the inner tube itself. This has been accomplished by the provision of a sufficient number of holes in the walls of the inner tube.

If the medium flowing through such a double-walled tube with a pressure balanced inner tube, is subjected to greatly varying pressures, a large number of pressure equalising holes must be provided in the inner tube and the holes themselves must also be of comparatively large size. If the holes be too small they give rise to an undesirable throttling or damming action when rapid fluctuations of pressure occur in the current of gas or vapours, so that the rapidly fluctuating pressure cannot propagate itself with sufficient rapidity throughout the annular space between the inner and outer tubes through the small holes. The result of this is that the hot inner tube is subjected to just those very stresses which it is intended to avoid.

If the holes in the inner tube be made large enough the equalisation of pressure can, of course, take place with sufficient rapidity, but there is then the risk that insulating material will be dragged through the holes and into the inner pipe by the medium flowing through the latter. For most purposes, such contamination of the flowing medium would not be permissible.

In order that the pressure equalising openings in the inner tube can be as large and as numerous as is required and at the same time to prevent the medium flowing through the inner tube from dragging the insulating material with it and to ensure also that the equalisation of pressure in the space filled with insulating material can take place likewise comparatively rapidly, it is also known to connect to the pressure equalising holes in the inner tube, finely perforated pressure equalising ducts or tubes which extend into the insulating layer. The sieve-like walls of such pressure equalising tubes make it impossible for any insulating material to be dragged through the pressure equalising holes into the interior of the inner tube, and ensure at the same time an equalisation of pressure with comparative rapidity. Experience has however shown that such pressure equalising tubes make the uniform or sufficiently dense filling of the space between the inner and outer walls with insulating material difficult, so that empty spaces may be produced in the insulating layer in course of time if the double-walled body is subjected to continual vibrations. Furthermore in the vicinity of the pressure equalising tubes only that part of the insulating material which is situated between the outer tube and the pressure equalising tubes is utilised for insulation of heat flowing towards the outer wall while that part of the insulating material situated between the pressure equalising tubes and the inner wall cannot be utilised for the insulation of heat flowing from the equalising tubes towards the outer wall of the double-walled body. The result of this is that those places on the outer wall of the double-walled body which are nearest to the pressure equalising tubes become comparatively hot which is undesirable for the reasons given above.

In order to overcome the last mentioned drawbacks, according to the present invention a double-walled body of the kind hereinbefore referred to is provided on the outside of the inner body with at least one hollow space further bounded by an intermediate body which fits closely to the insulating material filling a space between said intermediate body and the outer body. This hollow space on the outside of the inner body communicates both with the space within the inner body through at least one pressure equalising hole in this body and with said space filled with isolating material through at least one pressure equalising hole in said intermediate body.

Constructional examples of the subject matter of the invention are shown in the accompanying drawings in which:

Fig. 1 is a longitudinal section through a double-walled tube according to this invention.

Fig. 2 is a section on the line II—II of Fig. 1.

Fig. 3 is a cross section through a second, and

Fig. 4 a cross section through a third constructional form of a double-walled tube according to this invention.

In Figs. 1 and 2 of the drawing, 1 denotes a sieve-like perforated part and 2 an unperforated part of the inner tube of a double-walled tube which is used to convey a heated medium under a pressure greater than atmospheric pressure, e. g. air heated above 750° C. The holes in the part 1 are denoted by the reference numeral 3. In comparison with the unperforated part 2 this part 1 is comparatively short. The two parts 1 and 2 which have to convey the hot air consist either wholly of heat resisting (hammer scale proof) material or they are provided on the inside with a coating of such a material. A space 4 is provided between the adjoining ends of the two parts 1, 2 so that the latter can expand freely longitudinally. 5 denotes the outer pipe of the double-walled tube the function of which is to withstand any pressure stresses which may occur. Between the inner tube 1, 2 and the outer tube 5 an intermediate tube coaxial with them is provided, the diameter of this intermediate tube being only slightly larger than that of the inner tube. This intermediate tube is composed of an unperforated upper part 6 and a lower part 7 provided with numerous holes 7¹. A space 8 between the adjoining ends of the parts 6 and 7 enables these latter likewise to expand freely longitudinally. In the double-walled tube described there is a hollow space 9 on the outside of the inner tube 1, 2; the space 9 extends longitudinally of this inner tube and is bounded directly thereby and by the intermediate tube 6, 7. In this arrangement the unperforated part 6 of the intermediate tube surrounds the perforated part 1 of the inner tube and the perforated part 7 of the intermediate tube surrounds the unperforated part 2 of the inner tube. The space between the intermediate tube 6, 7 and the outer tube 5 is filled with a heat resisting, heat insulating material 10, such as asbestos, glass wool, or hardburnt kieselgur stone. This space is also made of such dimensions that the highest temperature to which the outer tube 5 is subjected lies still below the limit of temperature at which, if it be exceeded, a sudden impairing of the strength of the material would occur. The intermediate tube 6, 7 fits closely against the insulating material 10. In this arrangement the hollow space 9 between the tubes 1, 2 and 6, 7 communicates through the holes 3 in the part 1 of the inner tube with the space within the inner tube 1, 2 and through the holes 7¹ in the lower part 7 of the intermediate tube with the space between the intermediate tube 6, 7 and the outer tube 5. Between the spaces in question there is set up therefore under all fluctuations in the pressure of the medium flowing through the double-walled tube, due to the numerous holes 3 in the part 1 of the inner tube and the numerous holes 7¹ in the part 7 of the intermediate tube, a very rapid and practically perfect equalisation of pressure, so that neither the inner tube 1, 2 nor the intermediate tube 6, 7 is subjected to pressure strains. On the other hand no secondary flow which might be capable of dragging insulating material through the holes 7¹ and give rise to thermal losses, can take place either in the intermediate space 9 or in the space filled with the insulating material 10.

The perforated intermediate body need not necessarily be cylindrical. Thus the intermediate tube 11 of the constructional form shown in Fig. 3 is polygonal in cross section, the sides thereof being tangential to the cylindrical inner tube 12, which is provided in the same manner as the part 1 of Fig. 1 with holes over a comparatively short part of its length, so that in the vicinity of the corner edges 13 of the perforated intermediate tube 11 hollow spaces 14 are formed on the outside thereof which extend longitudinally of the inner body 12.

As shown in Fig. 4 a number of perforated bodies 18 which form channels 17 may be attached to the outside of an inner tube 15 having holes 16 in it. These bodies 18 bear by means of their external surfaces against the insulating material 19 which fills the annular space between the perforated inner tube 15 and the outer tube 20 of a double-walled tube. Each channel 17 communicates through at least one coordinated pressure equalising hole 16 with the space within the inner tube 15 and through pressure equalising holes 21 with the annular space filled with said material 19.

The number of holes to be provided in the inner body and in the intermediate body depends entirely on their size.

What is claimed is:

1. In a conduit for confined flow of high temperature gaseous pressure fluids, the combination of a pressure resisting external tube, formed of a material whose physical properties would be impaired at the temperature of the fluid to be conveyed; a pervious heat insulating lining within said tube; a flow directing internal tube spaced from said lining within the same; and means forming at least one rigid-walled hollow interspace affording a dead gas space of substantial volume between said internal tube and the internal surface of said lining, said interspace being in restricted communication with the interior of the internal tube and with the pervious body of said lining at points relatively so remote and so chosen with reference to the flow through the internal tube that said flow cannot induce sustained flow through the interspace.

2. The combination defined in claim 1 in which there is a single annular interspace which surrounds said internal tube, the latter being ported in a limited longitudinal area to afford communication from the internal tube to the interspace, communication between the interspace and the lining being limited to other portions of the length of said interspace.

3. The combination defined in claim 1 in which the internal tube is formed with a longitudinal expansion joint and is mechanically connected at its ends with said external tube.

4. The combination defined in claim 1 in which a plurality of interspaces, arranged in circular series around the internal tube, extend longitudinally along the internal tube.

EUGEN VILLIGER.

REFERENCES CITED

The following references are of record in the file of this patent:

UNITED STATES PATENTS

| Number | Name | Date |
|---|---|---|
| 459,035 | Costigan | Sept. 8, 1891 |
| 950,694 | Hamann | Mar. 1, 1910 |
| 1,714,948 | Coffin | May 28, 1929 |
| 2,059,487 | Peik | Nov. 3, 1936 |
| 2,076,210 | Stadtfeld | Apr. 6, 1937 |
| 2,150,182 | Munters | Mar. 14, 1939 |
| 2,301,657 | Hlavaty | Nov. 10, 1942 |
| 2,314,657 | Norris | Mar. 23, 1943 |